United States Patent [19]
Hunter et al.

[11] 3,825,148
[45] July 23, 1974

[54] HERMETIC SEALING SYSTEM FOR PLASTIC TANK AND COVER

[75] Inventors: Richard F. Hunter, Hickory, N.C.; Robert B. Truitt, West Lafayette, Ind.

[73] Assignee: General Electric Company, Schenectady, N.Y.

[22] Filed: Sept. 25, 1972

[21] Appl. No.: 291,728

[52] U.S. Cl............ 220/46 R, 52/141, 174/17 LF, 174/37, 174/52 S, 336/92, 336/94
[51] Int. Cl..... H01f 27/02, H05k 5/06, B65d 53/06
[58] Field of Search......... 174/17 R, 17 LF, 17 GF, 174/17 CT, 18, 37, 50, 52 S; 336/58, 68, 90, 92, 94; 27/7, 17; 136/170; 215/80; 220/5 R, 5 A, 45, 46 R, 81 R, 85 TC; 52/139, 140, 141

[56] References Cited
UNITED STATES PATENTS

| | | | |
|---|---|---|---|
| 795,319 | 7/1905 | Vanderman | 220/46 R UX |
| 1,220,262 | 3/1917 | Mueller et al. | 220/46 R UX |
| 2,527,464 | 10/1950 | Titmus | 27/17 X |
| 3,215,304 | 11/1965 | Rohe | 220/45 |
| 3,544,938 | 12/1970 | Bergmann et al. | 336/92 |
| 3,644,858 | 2/1972 | Galloway | 336/92 |
| 3,685,682 | 8/1972 | Frey | 220/46 R |

*Primary Examiner*—Laramie E. Askin
*Attorney, Agent, or Firm*—Francis X. Doyle; John J. Kelleher; Volker R. Ulbrich

[57] ABSTRACT

An hermetic sealing system for plastic tanks and covers. A plastic tank has a flat surface on the upper edge of its wall, such surface having a first groove formed therein. A lip portion extends from the flat surface and has a second groove therein. A flexible gasket is mounted in the first groove extending above the flat surface. A cover member rests on the flat surface compressing the flexible gasket and has an extending edge portion which fits into the second groove. An epoxy material is poured into the second groove and cured thus sealing the cover to the tank.

1 Claim, 2 Drawing Figures

PATENTED JUL 23 1974　　3,825,148

HERMETIC SEALING SYSTEM FOR PLASTIC TANK AND COVER

BACKGROUND OF INVENTION

This invention relates to an hermetic sealing system and more particularly to an hermetic sealing system for sealing plastic covers to plastic tanks.

In today's electrical distribution systems, much use is being made of underground distribution including primary and secondary electrical power lines and distribution equipment such as distribution transformers. Distribution transformers and the like electrical equipment are usually mounted in an enclosure, such as a tank, and the tank is usually filled with dielectric liquid such as mineral oil. As is well known, metallic tanks are subject to corrosion when placed underground either in a vault or when directly buried in the ground. To overcome this corrosion problem, polymeric or plastic material has been suggested as the basis for buried tanks. Two problems arise with respect to plastic tanks: first, the problem of water migration through the plastic material; and, second, the problem of hermetically sealing the cover to the tank to prevent the entrance of foreign matter into the enclosure.

The problem of water migration has been largely solved by use of vapor barriers in the plastic tank, for example, metallic liners. The problem of sealing is solved by this invention by providing an inner loop seal and an outer plastic weld which substantially seals the cover to the tank.

Therefore, it is a principal object of this invention to provide an hermetic seal between a plastic tank and a plastic cover.

A further object of this invention is to provide a double seal between a plastic tank and a plastic cover.

A still further object of this invention is to provide a sealed plastic transformer enclosure for use in underground distribution systems.

SUMMARY OF THE INVENTION

Briefly, in one form, this invention comprises a plastic container having a substantially flat upper surface with a lip portion extending therefrom. A first groove is formed in the flat upper surface and has a flexible gasket mounted therein. A second groove is formed in the lip portion. A cover member has a flat portion which corresponds to the flat surface of the container. It is also provided with an extension extending downwardly from the flat portion. The flat portion of the cover engages the flexible gasket while the extension fits into the second groove in the lip portion of the container. An epoxy material is poured into the groove in the lip portion and when cured firmly seals the cover and the container hermetically.

The invention which is sought to be protected will be particularly pointed out and distinctly claimed in the claims appended hereto. However, it is believed that this invention and the manner in which its various objects and advantages are obtained as well as other objects and advantages thereof will be better understood by reference to the following detailed description of the present preferred embodiment, particularly when considered in the light of the accompanying drawing.

DESCRIPTION OF PREFERRED EMBODIMENT

Figure 1:
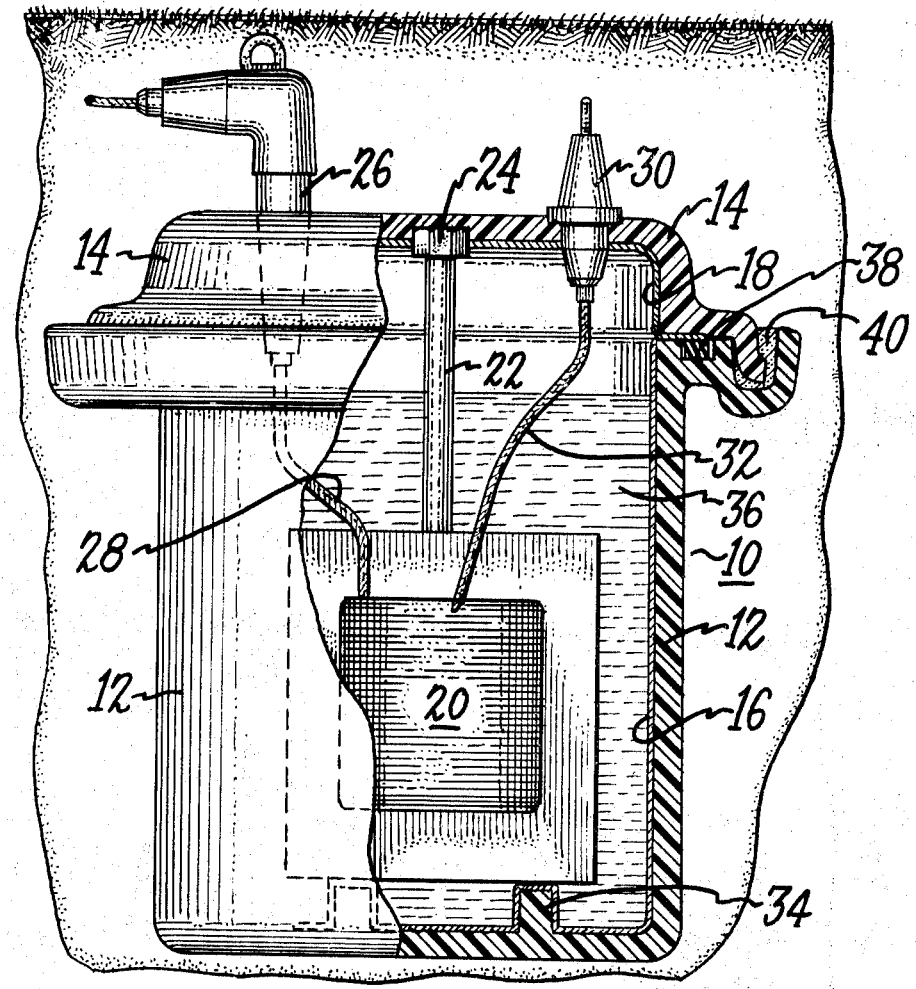
FIG. 1 is a plan view with parts broken away of a distribution transformer including a plastic tank and showing the preferred form of sealing system according to this invention.

Referring to the drawing in which like numerals are used to indicate like parts, and particularly to FIG. 1, there is shown an electrical distribution transformer 10 having a plastic tank 12 and a plastic cover member 14. As shown, a vapor barrier in the form of a metallic liner 16 is provided for tank 12 while a metal liner 18 is provided for the cover 14. A core and coil unit 20 is mounted in the tank 12. In the preferred embodiment shown, the core and coil unit 20 is suspended from cover 14 by means of a bar 22. The bar 22 may be secured at one end to the core and coil unit, for example, by welding to the core clamp. The other end of bar 22 is fastened to the threaded fastener 24 which is embedded into cover 14. A high voltage bushing 26 is preferably formed in the cover 14 and has a high voltage lead 28 extending to the core and coil unit 20. At least one low voltage bushing 30 is also formed in the cover 14 and has the low voltage lead 32 extending from the core and coil unit 20 as is shown. If desired, raised portions 34 may be provided in the bottom of tank 12 to help in supporting the core and coil unit 20. Also a liquid dielectric material 36 substantially fills the tank 12 completely covering the core and coil unit.

The cover 14 is hermetically sealed to tank 12 to prevent moisture or other contaminants from entering the enclosure. The hermetic seal includes a flexible compressed gasket 38 between the cover 14 and tank 12 as well as a "plastic weld" 40 also between the cover 14 and tank 12. This sealing system is best shown in FIG. 2 to which reference will now be made.

Figure 2:
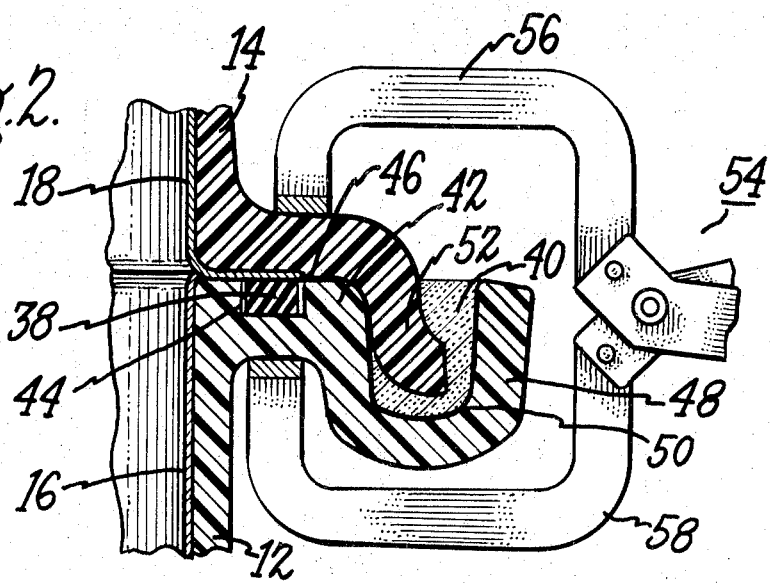
FIG. 2 is an enlarged partial sectional view showing the preferred sealing system of this invention in greater detail.

Referring to FIG. 2 it can be seen that the tank 12 is provided with a flat upper surface 42 having a groove 44 formed therein. The flexible gasket 38 is mounted in the groove 44. The cover 14 is provided with a mating or corresponding flat portion 46 which fits on the flat surface 42 and compresses the gasket 38. As can be seen in FIG. 2, the metal liner 18 extends along the flat portion 46 and engages the gasket 38. This is the preferred embodiment since it provides for the most effective vapor barrier. As will be understood, the gasket 38 compressed between the tank 12 and the cover 14 provides a seal to prevent entry of contaminants into the transformer enclosure. It also provides an effective seal preventing the dielectric liquid 36 from passing between the cover 14 and tank 12, especially prior to the curing of the epoxy material 40. Besides the flat surface 42, tank 12 is provided with an extending lip portion 48 which has a groove 50 formed therein. The cover 14 also has an extending portion 52 which extends beyond the flat surface 46 and into the groove 50 formed in lip 48. The groove 50 is filled with an epoxy material 40 which is compatible with the plastic material of tank 12 and cover 14. When the epoxy 40 cures, it firmly seals the cover portion 52 to the lip 48 in groove 50.

In the preferred form shown, core and coil unit 20 is suspended from the cover 14 and the weight of core and coil unit 20 causes the cover 14 to firmly seat against surface 42 compressing the gasket 38. However, due to manufacturing tolerances, it is considered desirable to provide a firm clamping between cover 14 and tank 12 to hold these parts in firm engagement until the epoxy material 40 has cured. Therefore, a clamping jig 54 is provided having a plurality of arms 56 and 58 (only one of each shown in FIG. 2). As can be seen from FIG. 2, arm 56 engages the cover 14 while arm 58 engages tank 12 forcing the flat surfaces 46 and 42 into intimate engagement. As will be understood, this firmly compresses gasket 38 preventing any leakage of the dielectric liquid 36 out into the groove 50. The groove 50 is then filled with an epoxy material 40 and the entire assembly is then placed in an oven for approximately one hour at 140° F. to cure epoxy 40.

While there has been shown and described the present preferred sealing system for a plastic tank and cover, it will, of course, be understood that the description is for illustrative purposes only, and the invention sought to be protected is that specified in the appended claims.

What is claimed as new and which it is desired to secure by Letters Patent of the United States is:

1. An hermetically sealed plastic tank and cover, said plastic tank having a flat upper surface, a groove formed in said flat upper surface, a flexible gasket mounted in said groove, a lip extending from said flat upper surface, a groove formed in said lip, a flat portion on said cover contacting said flat surface of said tank and compressing said gasket therebetween, an extending portion of said cover fitting into said groove formed in said lip, and a cured epoxy material filling said groove formed in said lip and sealing said extending portion of said cover to said lip.

* * * * *